(12) United States Patent
Choi

(10) Patent No.: US 9,310,966 B2
(45) Date of Patent: Apr. 12, 2016

(54) MOBILE TERMINAL AND METHOD FOR CONTROLLING THE SAME

(75) Inventor: Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 564 days.

(21) Appl. No.: 13/423,470

(22) Filed: Mar. 19, 2012

(65) Prior Publication Data

US 2012/0242602 A1    Sep. 27, 2012

(30) Foreign Application Priority Data

Mar. 24, 2011   (KR) .................. 10-2011-0026439
Mar. 24, 2011   (KR) .................. 10-2011-0026440

(51) Int. Cl.
G06F 3/041 (2006.01)
G06F 3/0482 (2013.01)
G06F 3/0488 (2013.01)

(52) U.S. Cl.
CPC ............ *G06F 3/0482* (2013.01); *G06F 3/0488* (2013.01)

(58) Field of Classification Search
CPC ................ G06F 3/0482; G06F 3/0488; G06F 2203/04104
See application file for complete search history.

(56) References Cited

U.S. PATENT DOCUMENTS

| | | | |
|---|---|---|---|
| 7,870,489 B2* | 1/2011 | Serita et al. | 715/730 |
| 7,900,228 B2* | 3/2011 | Stark et al. | 725/45 |
| 2008/0158190 A1* | 7/2008 | Waeller et al. | 345/173 |
| 2009/0289913 A1* | 11/2009 | Chang et al. | 345/173 |
| 2010/0079380 A1* | 4/2010 | Nurmi | 345/172 |
| 2010/0245259 A1* | 9/2010 | Bairagi et al. | 345/173 |
| 2010/0295793 A1* | 11/2010 | Srinivasan et al. | 345/173 |
| 2011/0016390 A1* | 1/2011 | Oh et al. | 715/702 |
| 2011/0037714 A1* | 2/2011 | Seo et al. | 345/173 |

* cited by examiner

*Primary Examiner* — Andrew Sasinowski
(74) *Attorney, Agent, or Firm* — Birch, Stewart, Kolasch & Birch, LLP

(57) ABSTRACT

A mobile terminal and a method for controlling the operation of the same are provided. A list screen including a list, in which a plurality of items is arranged in a first order is displayed on a display module. The list in which the plurality of items is arranged in reverse order of the first order is displayed upon receiving a multi-sequence input performed by touching a first item through a second region of the list screen while the first item is being touched through a first region thereof. It is possible to control various operations on the mobile terminal using a multi-sequence input that is performed such that a second touch input is performed through a second region of the screen while a first touch input is being performed through a first region.

15 Claims, 19 Drawing Sheets

MOBILE TERMINAL AND METHOD FOR CONTROLLING THE SAME

CROSS-REFERENCE TO RELATED APPLICATION

This application claims the benefit of Korean Application No. 10-2011-0026440, filed on Mar. 24, 2011, and No. 10-2011-0026439, filed on Mar. 24, 2011 in the Korean Intellectual Property Office, the disclosure of which is incorporated herein by reference.

BACKGROUND OF THE INVENTION

1. Field of the Invention

The present invention relates to a mobile terminal and a method for controlling the operation of the same, and more particularly to a mobile terminal and a method for controlling the operation of the same, wherein it is possible to control a variety of operations using multi-sequence inputs.

2. Description of the Related Art

A mobile terminal is a portable device having at least one of a function to perform voice and video communication, a function to receive and output information, and a function to store data. As the functionality of the mobile terminal has been diversified, a mobile terminal having various complex functions such as a function to capture still or moving images (i.e., photographs or videos), a function to reproduce music or video files, a game function, a function to receive broadcasts, and a wireless Internet function has been implemented as an all-in-one multimedia player.

Various novel attempts have been made in terms of hardware or software to provide more complex functions to the mobile terminal implemented as such a multimedia player. One example is provision of a user interface environment allowing the user to easily and conveniently find and select a desired function.

However, allocation of space for a user interface such as a keypad or a display is restricted since the mobile terminal should be designed taking into consideration mobility or portability. To efficiently use various complex functions provided by the mobile terminal, there is a need to control the operation of the mobile terminal using a new input/output scheme different from conventional input/output schemes.

SUMMARY OF THE INVENTION

Therefore, the present invention has been made in view of the above problems, and it is an object of the present invention to provide a mobile terminal and a method for controlling the operation of the same, wherein it is possible to control a variety of operations using various types of multi-sequence inputs.

In accordance with an aspect of the present invention, the above and other objects can be accomplished by the provision of a method for controlling operation of a mobile terminal, the method including displaying a list screen including a list, in which a plurality of items is arranged in a first order, on a display module, receiving a multi-sequence input performed by touching a first item through a second region of the list screen while the first item is being touched through a first region thereof, and displaying the list in which the plurality of items is arranged in reverse order of the first order.

In accordance with another aspect of the present invention, there is provided a method for controlling operation of a mobile terminal, the method including displaying an operation screen, in which a plurality of touchable objects is arranged, on a display module, receiving a multi-sequence input performed by touching a second object through a second region of the operation screen while a first object is being touched through a first region thereof, and sequentially performing operations corresponding to the first and second objects in response to receiving the multi-sequence input.

In accordance with another aspect of the present invention, there is provided a method for controlling operation of a mobile terminal, the method including displaying a screen, in which a plurality of touchable objects is arranged, on a display module, displaying an action list, in which items corresponding to operations associated with a first object are arranged, on a portion of the display module upon receiving a first input performed by touching the first object through a first region of the screen, and activating an item corresponding to an operation associated with both the first object and a second object among the items of the action list upon receiving a second input performed by touching the second object through a second region of the screen while the first input is being received.

In accordance with another aspect of the present invention, there is provided a method for controlling operation of a mobile terminal, the method including displaying an operation screen, in which a plurality of icons is arranged, on a display module, receiving a multi-sequence input performed by touching a first icon through a second region of the operation screen while a first region of the operation screen is being touched, and sequentially displaying sub-icons belonging to the first icon instead of the first icon in a manner in proportion to a duration time of the multi-sequence input.

In accordance with another aspect of the present invention, there is provided a mobile terminal including a display module for displaying a list screen including a list in which a plurality of items is arranged in a first order, and a controller for displaying the list in which the plurality of items is arranged in reverse order of the first order upon receiving a multi-sequence input performed by touching a first item through a second region of the list screen while the first item is being touched through a first region thereof.

In accordance with another aspect of the present invention, there is provided a mobile terminal including a display module for displaying an operation screen in which a plurality of touchable objects is arranged, and a controller for sequentially performing operations corresponding to a first object and a second object upon receiving a multi-sequence input performed by touching the second object through a second region of the operation screen while the first object is being touched through a first region thereof.

In accordance with another aspect of the present invention, there is provided a mobile terminal including a display module for displaying a screen in which a plurality of touchable objects is arranged, and a controller for displaying an action list, in which items corresponding to operations associated with a first object are arranged, on a portion of the display module upon receiving a first input performed by touching the first object through a first region of the screen and activating an item corresponding to an operation associated with both the first object and a second object among the items of the action list upon receiving a second input performed by touching the second object through a second region of the screen while the first input is being received.

In accordance with another aspect of the present invention, there is provided a mobile terminal including a display module for displaying an operation screen in which a plurality of icons is arranged, and a controller for sequentially displaying, upon receiving a multi-sequence input performed by touching a first icon through a second region of the operation screen while a first region of the operation screen is being touched, sub-icons belonging to the first icon instead of the first icon in a manner in proportion to a duration time of the multi-sequence input.

In accordance with another aspect of the present invention, the above and other objects can also be accomplished by the provision of a processor-readable recording medium that stores a program allowing a processor to perform the method for controlling operation of the mobile terminal described above.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

A mobile terminal as described in this specification includes a mobile phone, a smart phone, a laptop, a digital broadcast terminal, a Personal Digital Assistant (PDA), a Portable Multimedia Player (PMP), a navigation device, or the like. The words "module" or "unit", which are appended to terms describing components, are merely used for ease of explanation of the present invention and have no specific meaning or function with respect to the components. Thus, the words "module" and "unit" may be used interchangeably.

Figure 1:
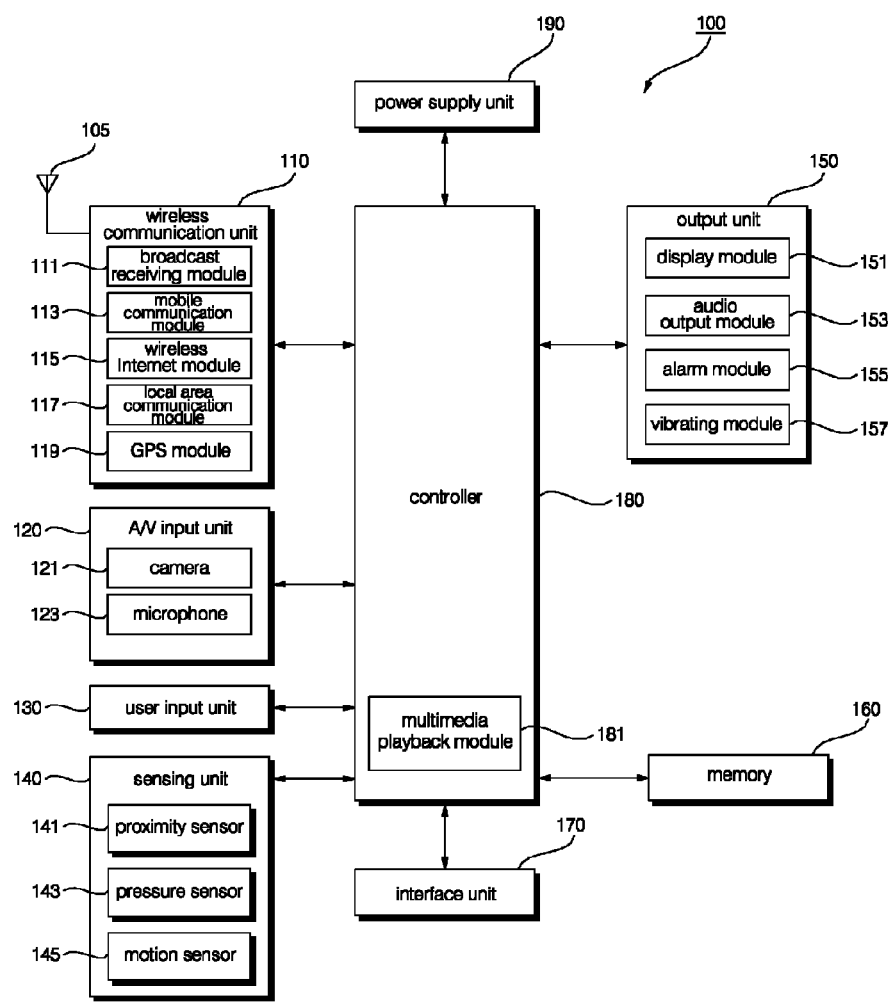
FIG. 1 is a block diagram of a mobile terminal according to an embodiment of the present invention.

FIG. 1 is a block diagram of a mobile terminal according to an embodiment of the present invention. The mobile terminal according to the embodiment of the present invention is described below with reference to FIG. 1, from the viewpoint of functional components thereof.

As shown in FIG. 1, the mobile terminal 100 may include a wireless communication unit 110, an Audio/Video (AV) input unit 120, a user input unit 130, a sensing unit 140, an output unit 150, a memory 160, an interface unit 170, a controller 180, and a power supply unit 190. In actual applications, two or more of these components may be combined into one component or one component may be divided into two or more components as needed.

The wireless communication unit 110 may include a broadcast receiving module 111, a mobile communication module 113, a wireless Internet module 115, a local area communication module 117, and a Global Positioning System (GPS) module 119.

The broadcast receiving module 111 receives at least one of a broadcast signal and broadcast-related information from an external broadcast management server through a broadcast channel. The broadcast channel may include a satellite channel, a terrestrial channel, or the like. The broadcast management server may be a server that generates and transmits at least one of a broadcast signal and broadcast-related information or a server that receives and transmits at least one of a broadcast signal and broadcast-related information, which have been previously generated, to a terminal.

The broadcast-related information may be information relating to a broadcast channel, a broadcast program, or a broadcast service provider. The broadcast signal may not only include a TV broadcast signal, a radio broadcast signal, or a data broadcast signal but may also include a broadcast signal generated by incorporating a data broadcast signal into a TV or radio broadcast signal. The broadcast-related information may also be provided through a mobile communication network. In this case, the broadcast-related information may be received by the mobile communication module 113. The broadcast-related information may be provided in various forms. For example, the broadcast-related information may be provided in the form of a Digital Multimedia Broadcast (DMB) Electronic Program Guide (EPG) or a Digital Video Broadcast-Handheld (DVB-H) Electronic Service Guide (ESG).

The broadcast receiving module 111 receives a broadcast signal using a variety of broadcast systems. Specifically, the broadcast receiving module 111 may receive a digital broadcast signal using a digital broadcast system such as a Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T) system. The broadcast receiving module 111 may be configured to be suitable not only for such a digital broadcast system but also for any other broadcast system that provides a broadcast signal. A broadcast signal and/or broadcast-related information received through the broadcast receiving module 111 may be stored in the memory 160.

The mobile communication module 113 transmits and receives a wireless signal to and from at least one of a base station, an external terminal, and a server over a mobile communication network. The wireless signal may include a voice call signal, a video call signal, or various types of data associated with transmission and reception of a text/multimedia message.

The wireless Internet module 115 is an internal or external module for wireless Internet access which may be provided to the mobile terminal 100. Here, Wireless LAN (WLAN) (i.e., Wi-Fi), Wireless broadband (WiBro), World Interoperability for Microwave Access (WiMax), or High Speed Downlink Packet Access (HSDPA) may be used as a wireless Internet technology.

The local area communication module 117 is a module for local area communication. Here, Bluetooth, Radio Frequency Identification (RFID), Infrared Data Association (IrDA,), Ultra Wideband (UWB), or ZigBee may be used as a local area communication technology.

The GPS module 119 receives location information from multiple GPS satellites.

The A/V input unit 120 is provided to input an audio or video signal and may include a camera 121 and a microphone 123. The camera 121 processes an image frame such as a still image (or photograph) or a moving image (or video) obtained through an image sensor in a video communication mode or an image capture mode. The processed picture frame may be displayed on the display module 151.

The picture frame processed at the camera 121 may be stored in the memory 160 or may be transmitted to the outside through the wireless communication unit 110. Two or more cameras 121 may be provided depending on the configuration of the mobile terminal.

The microphone 123 receives an external audio signal in a voice or video communication mode, a record mode, or a voice recognition mode and processes the same into audio data. In the voice or video communication mode, the processed audio data may be converted into a form transmittable to a mobile communication base station through the mobile communication module 113. A variety of noise removal algorithms may be used to remove noise generated in the course of receiving an external audio signal through the microphone 123.

The user input unit 130 generates key input data corresponding to a key input operation that a user has performed to control the operation of the terminal. The user input unit 130 may include a key pad, a dome switch, or a (resistive/capacitive) touchpad that can receive a command or information through a push or touch operation by the user. The user input unit 130 may also include a jog wheel, a joystick, a finger mouse, or the like. In the case in which the touchpad forms a multilayer structure with the display module 151 that is described later, the touchpad may be referred to as a "touch screen".

The sensing unit 140 detects a current state of the mobile terminal 100 such as whether the mobile terminal 100 is opened or closed, the position of the mobile terminal 100, or whether or not the user is in contact with the mobile terminal 100 and generates a sensing signal for controlling the operation of the mobile terminal 100. The sensing unit 140 may sense whether the mobile terminal 100 is opened or closed when the mobile terminal 100 is a slide phone. The sensing unit 140 may also be responsible for sensing functions associated with whether or not the power supply unit 190 is supplying power or whether or not the interface unit 170 is coupled to an external device.

The sensing unit 140 may include a detection sensor 141, a pressure sensor 143 and a motion sensor 145. The detection sensor 141 may detect an approaching object or whether an object is present near the mobile terminal 100 without mechanical contact. More specifically, the detection sensor 141 may detect an approaching object based on change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary, depending on the use environment of the mobile terminal 100. In the case in which the pressure sensor 143 may be installed in the display module 151, it is possible to differentiate a typical touch input from a pressure touch input, which is generated by applying greater pressure than that used to generate a typical touch input, based on a signal output by the pressure sensor 143. It is also possible to determine the magnitude of pressure applied to the display module 151 upon receiving a pressure touch input based on the signal output by the pressure sensor 143.

The motion sensor 145 may detect the location, motion, or the like of the mobile terminal 100 using an acceleration sensor, a gyro sensor, or the like. With developments of micro-electromechanical system (MEMS) technology, acceleration sensors, which can be used for the motion sensor 145, have been widely used as a device for converting acceleration in one direction into an electric signal. Various types of acceleration sensors have been used ranging from an acceleration sensor for detecting great accelerations, which may be embedded in an airbag system of an automobile to detect collisions, to an acceleration sensor for detecting small accelerations, which may be used as a gaming input device to detect fine motions of the hand. In general, two-axis or three-axis acceleration sensors are incorporated into a single package. Only the z-axis acceleration sensor may be needed depending on the use environment of the sensor. Thus, when there is a need to use an x or y-axis acceleration sensor instead of the z-axis acceleration sensor, the x or y-axis acceleration sensor may be mounted on an additional substrate and the additional substrate may then be mounted on a main substrate.

As a sensor for measuring angular velocity, the gyro sensor may determine a rotated direction of the mobile terminal 100 relative to a reference direction.

The output unit 150 is provided to output audio signals, video signals, or alarm signals. The output unit 150 may include the display module 151, an audio output module 153, an alarm module 155, and a haptic module 157.

The display module 151 displays information processed in the mobile terminal 100. For example, when the mobile terminal 100 is in a voice or video communication mode, the display module 151 displays a communication-related User Interface (UI) or Graphical User Interface (GUI). When the mobile terminal 100 is in a video communication mode or an image capture mode, the display module 151 may individually or simultaneously display captured or received images and may display a corresponding UI or GUI.

In the case in which the display module 151 forms a multilayer structure with the touchpad to construct a touch screen as described above, the display module 151 may not only be used as an output device but may also be used as an input device which allows the user to input information by touch.

In the case in which the display module 151 constructs a touch screen, the display module 151 may include a touch screen panel, a touch screen panel controller, or the like. The touch screen panel is a transparent panel externally attached to the mobile terminal 100 and may be connected to an internal bus of the mobile terminal 100. The touch screen panel monitors touches and sends, upon detecting a touch input, corresponding signals to the touch screen panel controller. The touch screen panel controller processes the signals and transmits the resulting data to the controller 180 and the controller 180 then determines whether or not a touch input has occurred and which region of the touch screen has been touched.

The display module 151 may include electronic paper (e-paper). As a type of reflective display, e-paper can provide as high resolution as ordinary ink on paper, wide viewing angles, and excellent visual properties with a bright white background. E-paper can be implemented on various types of substrates such as a plastic, metallic or paper substrate and can display and maintain an image thereon even after power is cut off. In addition, e-paper can increase battery life of the mobile terminal 100 because it does not require a backlight assembly. The display module 151 may be implemented as e-paper by using electrostatically charged hemispherical twist balls, using electrophoretic deposition, or using microcapsules.

The display module 151 may include at least one of a liquid crystal display, a thin film transistor-liquid crystal display, an organic light-emitting diode, a flexible display, and a 3D display. Two or more display modules 151 may be provided depending on the implementation of the mobile terminal 100. For example, both an external display module (not shown) and an internal display module (not shown) may be provided to the mobile terminal 100.

The audio output module 153 outputs audio data received from the wireless communication unit 110 or stored in the memory 160 when the mobile terminal 100 is in an incoming call receiving mode (i.e., a ringing mode), a voice or video communication mode, a record mode, a voice recognition mode, or a broadcast reception mode. The audio output module 153 outputs audio signals associated with functions performed by the mobile terminal 100, for example, an audio signal associated with an incoming call sound (i.e., ringtone) or a message receipt sound. The audio output module 153 may include a speaker, a buzzer, or the like.

The alarm module 155 outputs a signal notifying the user that an event has occurred in the mobile terminal 100. Examples of the event occurring in the mobile terminal 100 include incoming call reception, message reception, and key signal input. The alarm module 155 outputs a signal notifying the user of the occurrence of an event in a different form from the audio or video signal. For example, the alarm module 155 may output the notification signal through vibration. When an incoming call signal is received or when a message is received, the alarm module 155 may output a signal indicating the reception of the incoming call signal or the message. When a key signal is input, the alarm module 155 may output a signal as a feedback to the key signal input. The user can perceive the event occurrence through the signal output from the alarm module 155. The mobile terminal 100 may also output a signal indicating the event occurrence through the display module 151 or the audio output module 153.

The haptic module 157 may provide various haptic effects that can be perceived by the user. A typical example of the haptic effect generated by the haptic module 157 is vibration. In the case in which the haptic module 157 generates vibration as a haptic effect, the haptic module 157 may change the intensity, pattern, or the like of the vibration. The haptic module 157 may synthesize different vibrations and output the resulting signal or may sequentially output different vibrations.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by stimulating the surface of the skin, a haptic effect obtained through contact with an electrode, a haptic effect obtained using electrostatic force, and a haptic effect obtained by realizing the sense of heat or cold using a device capable of absorbing or generating heat. The haptic module 157 may be implemented so as not only to provide a haptic effect to the user through direct contact but also to enable the user to perceive a haptic effect using the kinesthetic sense of the fingers or the arms. The mobile terminal 100 may include two or more haptic modules 157 depending on the form of implementation of the mobile terminal 100.

The memory 160 may store a program for processing and control by the controller 180 and may function to temporarily store input or output data items (for example, a phonebook, messages, still images, and moving images).

The memory 160 may include a storage medium of at least one of a variety of types including a flash memory type, a hard disk type, a multimedia card micro type, a card memory type (for example, SD or XD memory), RAM, and ROM. The mobile terminal 100 may utilize cloud storage that performs a storage function of the memory 160 over the Internet.

The interface unit 170 functions to interface with all external devices connected to the mobile terminal 100. Examples of the external devices connected to the mobile terminal 100 include a wired/wireless headset, an external battery charger, a wired/wireless data port, a memory card, a card socket such as a Subscriber Identification Module (SIM) card socket or a User Identification Module (UIM) card socket, an audio Input/Output (I/O) terminal, a video I/O terminal, and an earphone. The interface unit 170 may receive power or data from such an external device and provide the same to each internal component of the mobile terminal 100 and may transmit internal data of the mobile terminal 100 to the external device.

When the mobile terminal 100 is connected to an external cradle, the interface unit 170 may provide a path through which power is provided from the external cradle to the mobile terminal 100 or a path through which various command signals, which the user has input on the cradle, are provided from the external cradle to the mobile terminal 100.

The controller 180 generally controls the operation of each component to control the overall operation of the mobile terminal 100. For example, the controller 180 performs control and processing associated with voice communication, data communication, video communication, and the like. The controller 180 may include a multimedia playback module 181 for multimedia reproduction. The multimedia playback module 181 may be implemented by hardware in the controller 180 or may be implemented by software separately from the controller 180.

Under control of the controller 180, the power supply unit 190 receives external power or internal power and supplies power required for operation to each component.

The mobile terminal 100 constructed as described above may be implemented such that it can operate in communication systems, including a wired/wireless communication system and a satellite based communication system, which can transmit data through frames or packets.

Figure 2:
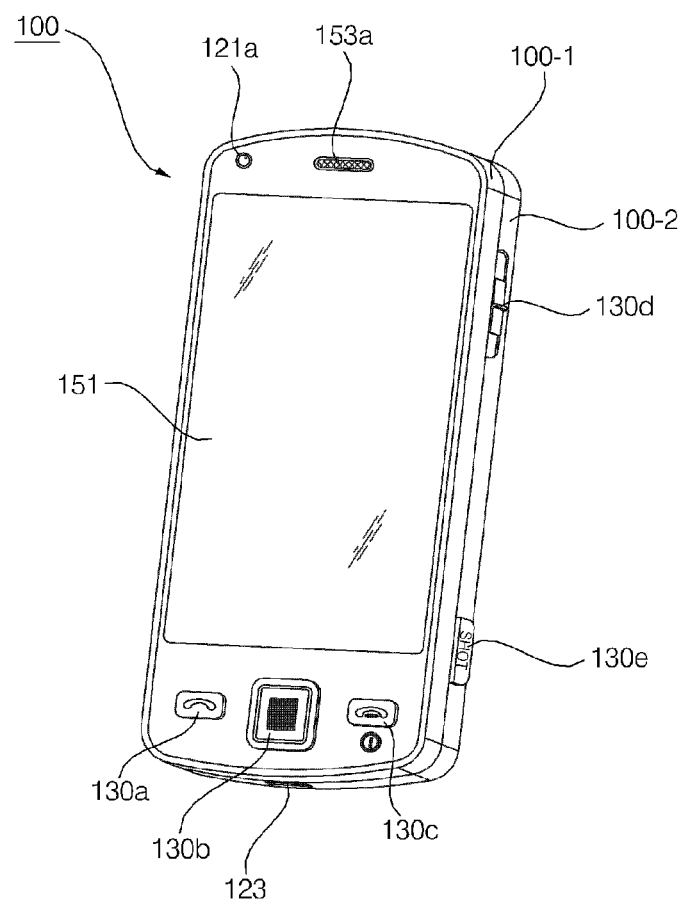
FIG. 2 is a front perspective view of the mobile terminal according to an embodiment of the present invention.
Figure 3:
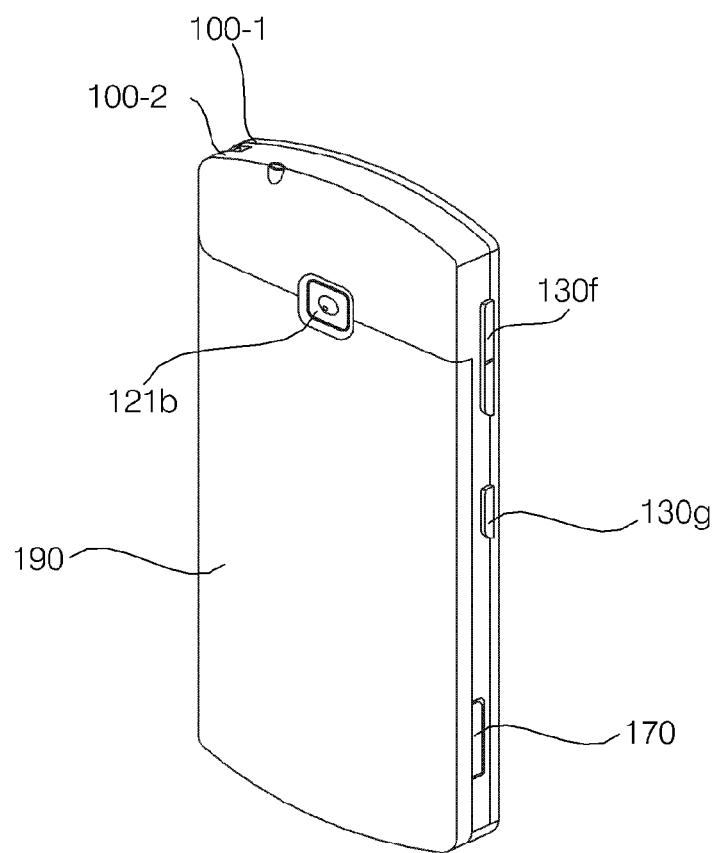
FIG. 3 is a rear perspective view of the mobile terminal shown in FIG. 2.

FIG. 2 is a front perspective view of the mobile terminal according to an embodiment of the present invention and FIG. 3 is a rear perspective view of the mobile terminal shown in FIG. 2. In the following, the mobile terminal according to the present invention is described in detail with reference to FIGS. 2 and 3, from the viewpoint of components viewed on the external surface thereof. For ease of explanation, the following description will be given with reference to a bar type mobile terminal having a front touch screen as an example among various types of mobile terminals such as folder, bar, swing, and slider types. However, the present invention is not limited to the bar type mobile terminal and can be applied to any type of mobile terminal including the types described above.

Referring to FIG. 2, a case defining the external appearance of the mobile terminal 100 includes a front case 100-1 and a rear case 100-2. A variety of electronic parts are provided in a space defined within the front and rear cases 100A-1 and 100-2. The front case 100-1 and the rear case 100-2 may be formed through synthetic resin injection molding may be formed of a metal material such as stainless steel (STS) or titanium (Ti).

A display module 151, a first audio output module 153a, a first camera 121a, and first to third user input units 130a, 130b, and 130c may be arranged in a main body of the mobile terminal 100, specifically, in the front case 100-1. A fourth user input unit 130d, a fifth user input unit 130e, and a microphone 123 may be arranged on a side surface of the rear case 100-2.

A touchpad may be formed in a layered structure overlapping the display module 151 such that the display module 151 operates as a touch screen allowing the user to input information through touch.

The first audio output module 153a may be implemented in a receiver or speaker form. The first camera 121a may be implemented in a form suitable for capturing a still or moving image of the user or the like. The microphone 123 may be implemented in a form suitable for receiving sound such as user voice.

The first to fifth user input units 130a, 130b, 130c, 130d, and 130e and sixth to seventh user input units 130f and 130g may be collectively referred to as a user input unit 130. The user input unit 130 may be of any type, provided that the user input unit 130 is operated in a tactile manner such that it is operated through tactile interaction with the user.

For example, the user input unit 130 may be implemented as a dome switch or a touchpad that can receive a command or information through a push or touch operation by the user. The user input unit 130 may also be implemented as a jog wheel or a joystick. In terms of functionality, the first to third user input units 130a, 130b, and 130c allow the user to input a command such as send, mouse pointer movement, screen scroll, start, or end and the fourth user input unit 130d allows the user to select an operating mode of the mobile terminal 100. The fifth user input unit 130e may function as a hot key for activating a special function of the mobile terminal 100.

Referring to FIG. 3, a second camera 121b may be additionally provided on a rear surface of the rear case 100-2 and sixth and seventh user input units 130f and 130g may be provided on a side surface of a second body 100B.

The second camera 121b may have a capture direction substantially opposite to that of the first camera 121a and have a different pixel resolution from that of the first camera 121a. A flash lamp (not shown) and a mirror (not shown) may be additionally provided on the mobile terminal 100 near the second camera 121b. The flash lamp shines light toward a subject when the subject is captured using the second camera 121b. The mirror allows the user to view their face or the like when capturing their image using the second camera 121b (i.e., in the case of self-shooting).

A second audio output module (not shown) may be additionally provided on the rear case 100-2. The second audio output module may implement a stereo function in conjunction with the first audio output module 153a and may be used to perform voice or video communication in a speakerphone mode.

The interface unit 170 may be used as a channel through which the mobile terminal 100 exchanges data with an external device. In addition to an antenna for communication, an antenna for receiving broadcast signals (not shown) may be provided on the front case 100-1 and the rear case 100-2 at a portion thereof. Each antenna may be mounted to be retractable from the rear case 100-2.

A power supply unit 190 for supplying power may be provided on the rear case 100-2. The power supply unit 190 is, for example, a rechargeable battery which is detachably mounted to the rear case 100-2 for the purpose of recharging or the like.

Although the above description has been given with reference to an example in which the second camera 121b is provided on the rear case 100-2, the present invention is not limited to this example. When the second camera 121b is not provided, the first camera 121a may be formed to be rotatable so as to enable capturing in the same capture direction as that of the second camera 121b.

DEFINITIONS OF TERMS

Figure 4:
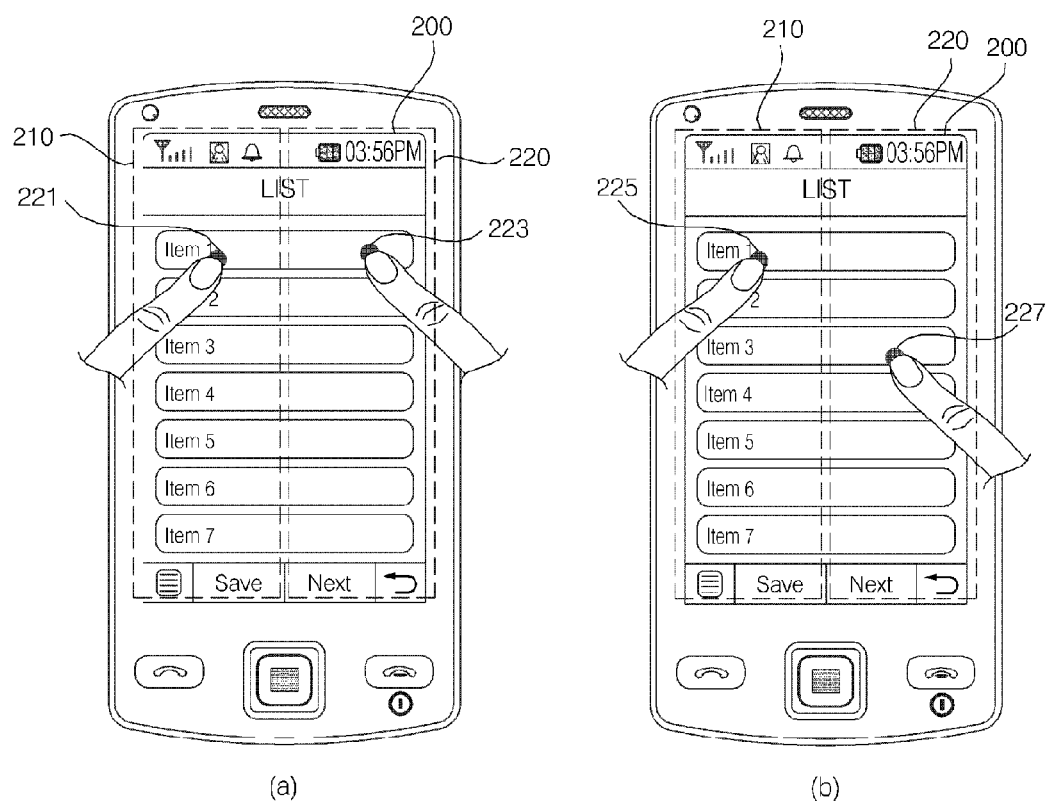
FIG. 4 is a drawing used to explain terms used in a method for controlling the operation of a mobile terminal according to the present invention.

FIG. 4 is a drawing used to explain terms used in a method for controlling the operation of a mobile terminal according to the present invention. As shown in FIG. 4(a), a screen 200 is divided into at least two regions, left and right. Here, when the left region is referred to as a first region 210 and the right region is referred to as a second region 220, a multi-touch input including a first touch input 221 performed through the first region 210 and a second touch input 223 performed through the second region 220 may be defined as a 'multi-region multi-touch input'. Here, the sizes of the first region 210 and the second region 220 may be equal or different.

The multi-region multi-touch input may be defined as a multi-sequence input when the screen 200 is touched through the first touch input 221 and the second touch input 223 of the multi-region multi-touch at different times, for example, when the screen 200 is touched through the second touch input 223 while the screen 200 is being touched through the first touch input 221 or when the screen 200 is touched through the first touch input 221 while the screen 200 is being touched through the second touch input 223.

Even when different items are touched through a first touch input 225 and a second touch input 227 as shown in FIG. 4(b), the first touch input 225 and the second touch input 227 may be defined as a 'multi-sequence input' if the screen 200 is touched through the first and second touch inputs 225 and 227 at different locations at different times.

In the case in which a general touch input is performed, an operation corresponding to the touch input is performed at the moment when the touch input is released from the screen 200 after the touch input is performed upon the screen 200. Accordingly, it is possible to discriminate between a general touch input and a multi-sequence input that is performed such that a second touch input is performed while a first touch input is being performed.

Depending on the use environment of the mobile terminal, the screen 200 may be divided into upper and lower regions rather than the left and right regions and the upper region may be defined as a first region and the lower region may be defined as a second region.

<<List>>

Figure 5:
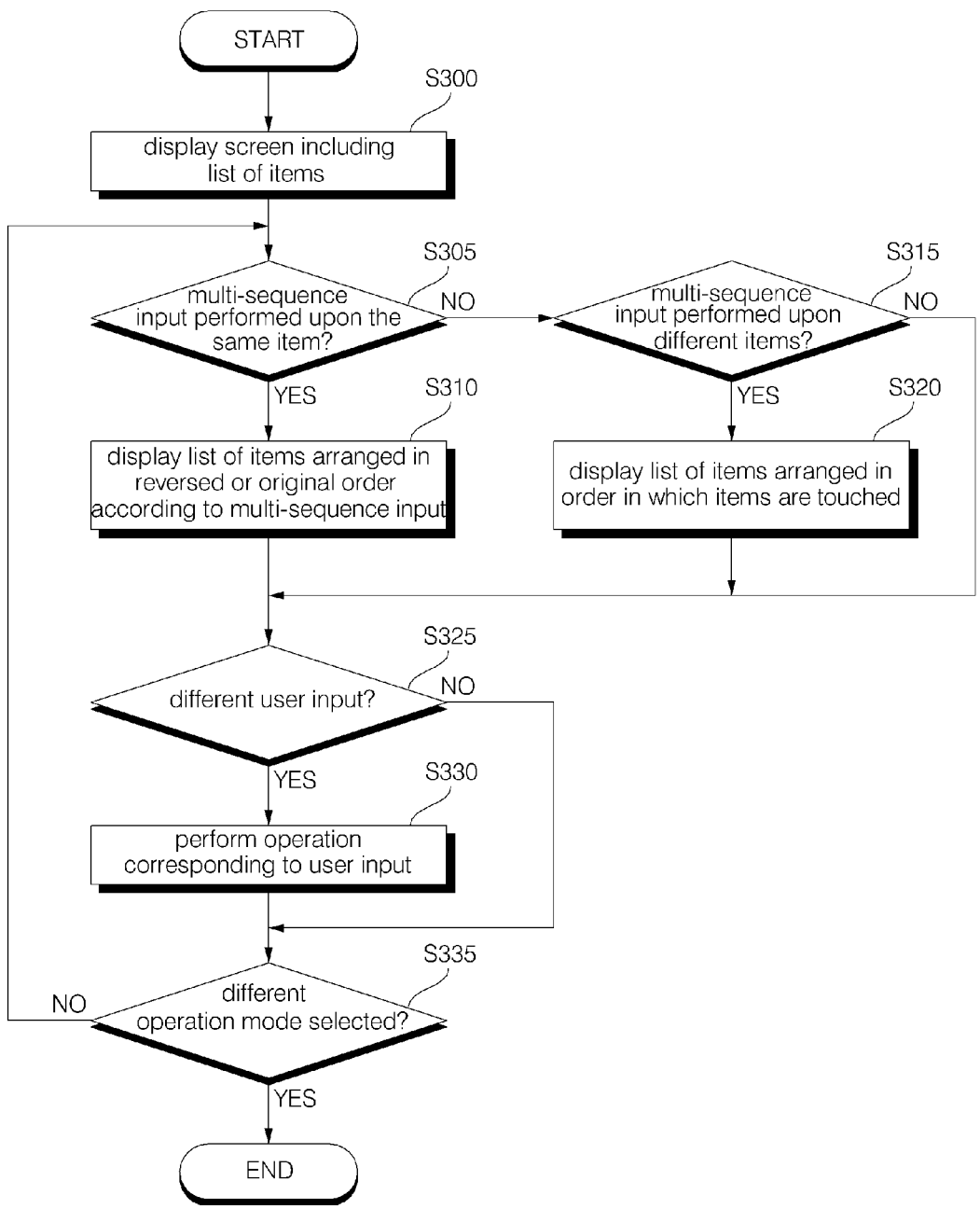
FIG. 5 is a flowchart illustrating an embodiment associated with a list in a method for controlling the operation of a mobile terminal according to the present invention.

FIG. 5 is a flowchart illustrating an embodiment associated with a list in a method for controlling the operation of a mobile terminal according to the present invention.

As shown in FIG. 5, when an operation menu such as a phonebook menu, a sent mail/inbox menu, an MP3 player menu, a video player menu, or an image view menu is selected, the controller 180 displays a list screen including a list of items corresponding to the selected operation menu on the display module 151 including a touch screen (S300).

When a multi-sequence input is performed upon the same item while the list screen is being displayed (S305), the controller 180 displays the list of items, which are arranged in the reverse order or in the original order according to the multi-sequence input, on the display module 151 (S310).

For example, when an item is touched through the second region of the list screen while the same item is being touched through the first region, the list of items which are arranged in reverse order of the original order may be displayed. On the contrary, when an item is touched through the first region while the same item is being touched through the second region, the list of items which are arranged in the original order may be displayed.

In addition, when a multi-sequence input is performed upon different items while the list screen is being displayed (S315), the controller 180 displays a list of items which are arranged in an order corresponding to the order in which the different items have been touched (S320). For example, upon receiving a multi-sequence input which is performed such that a second item is touched through the second region while a first item is being touched through the first region, the controller 180 displays an item list in which a third item is arranged next to the second item.

Here, two or more different items may be touched through a multi-sequence input. The controller 180 may display items that are touched through a multi-sequence input in a different color or form from other items or in a different shade or boundaries from other items such that the touched items can be discriminated from other items. The controller 180 may also generate a haptic effect corresponding to the items which are touched through a multi-sequence input.

When a different user input such as a key input or a general touch input is performed (S325), the controller 180 performs a control operation to perform an operation corresponding to the user input (S330). For example, when a title region of a list is touched, all items included in the list may be selected. In addition, when an input of dragging or flicking the list screen in a direction has been performed, the list may be scrolled in a corresponding direction and speed.

This operation may be repeatedly performed until another operation mode is selected (S335). Through the procedure described above, it is possible to display a list in various forms through a multi-sequence input performed upon a screen on which the list is being displayed.

Figure 6:
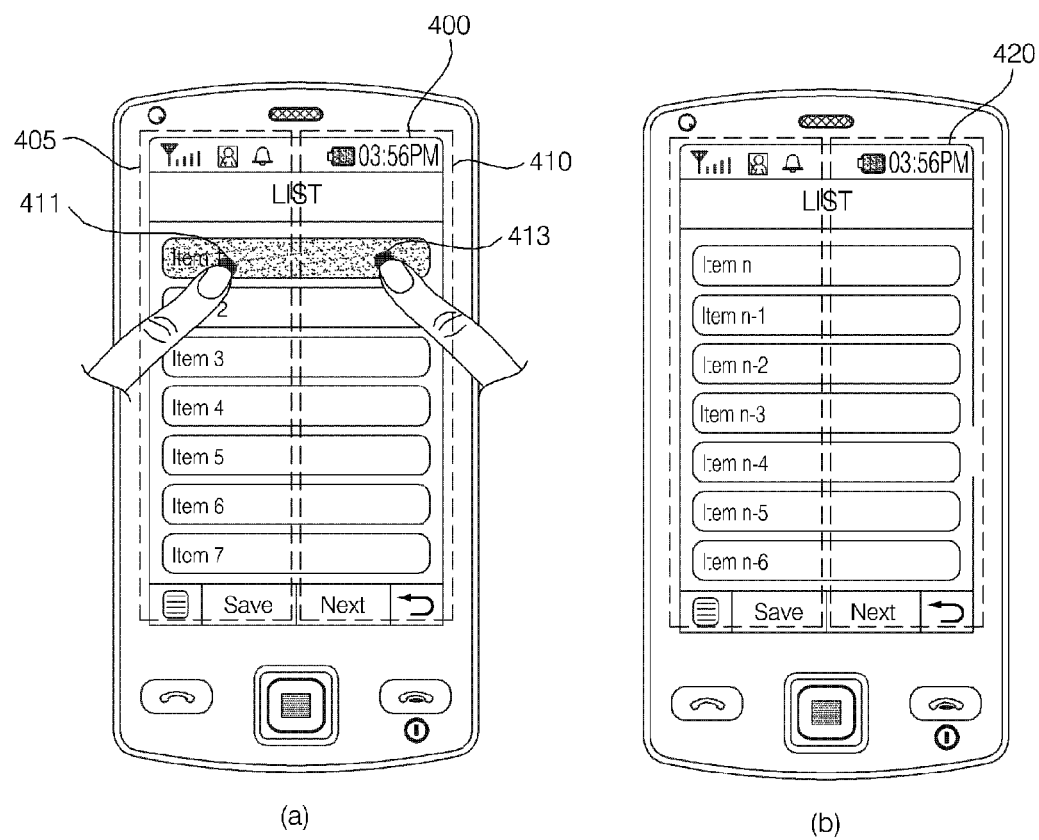
FIGS. 6 to 8 illustrate screens displayed on the display module which are used to explain operation control associated with a list according to an embodiment of the present invention.
Figure 7:
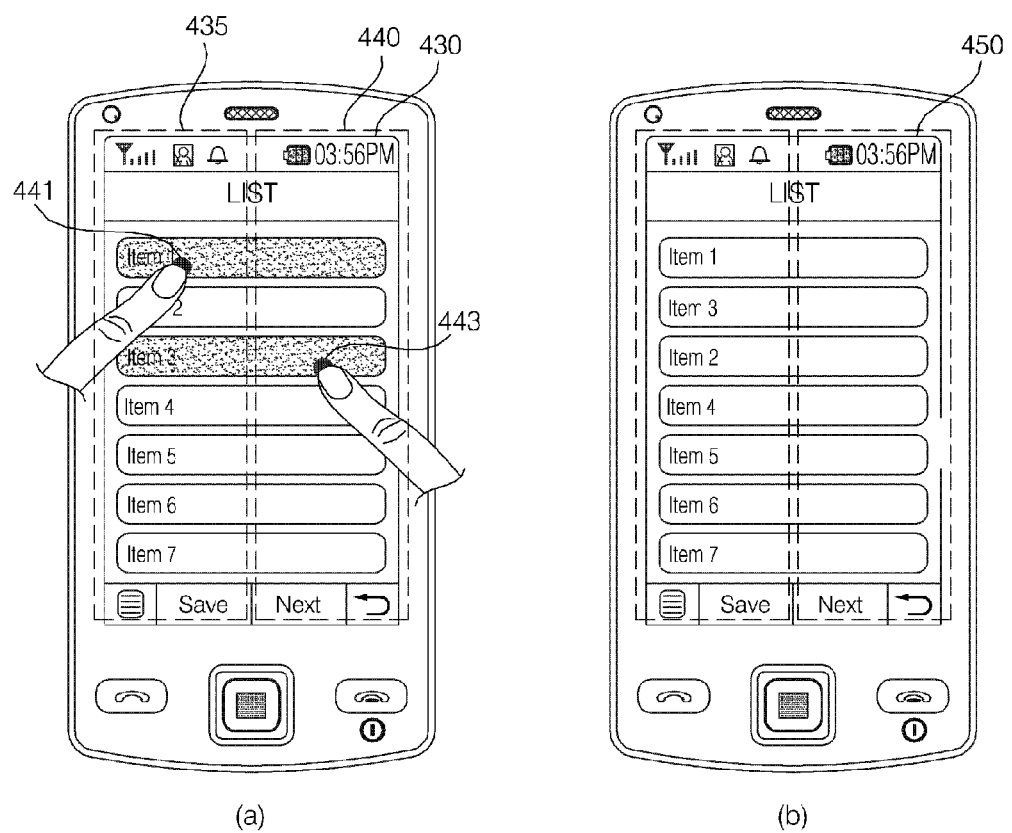
Figure 8:
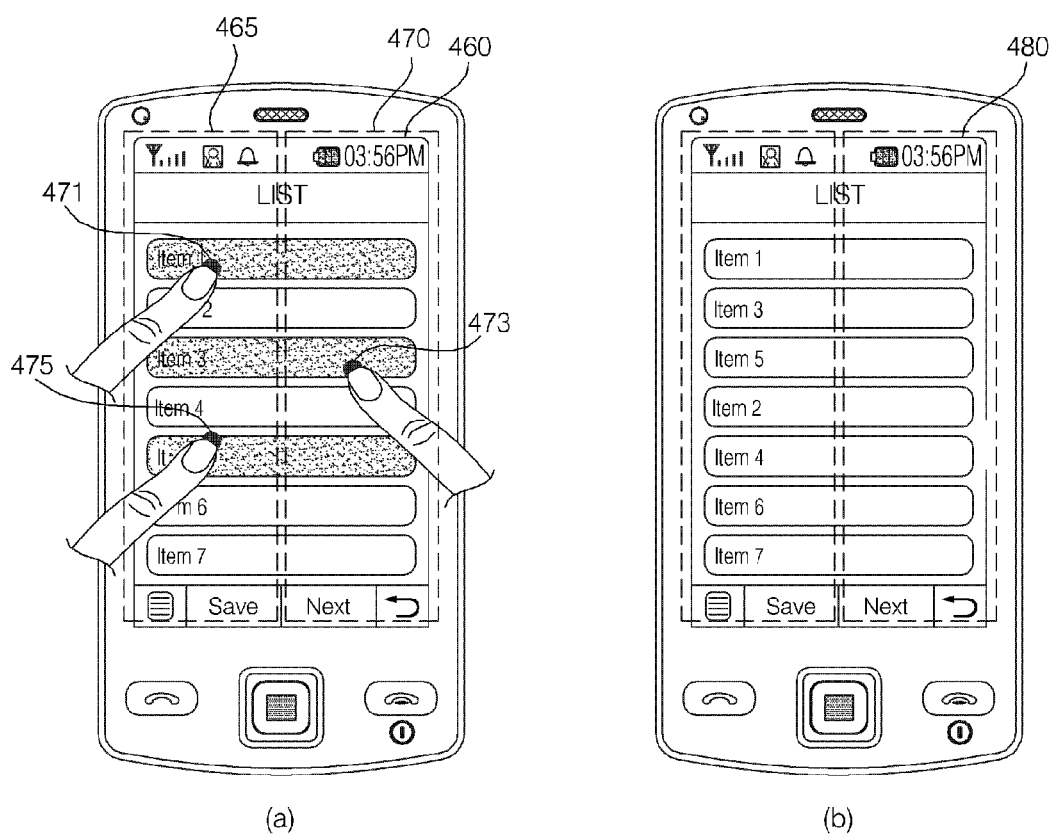

FIGS. 6 to 8 illustrate screens displayed on the display module which are used to explain operation control associated with a list according to an embodiment of the present invention.

FIG. 6(*a*) illustrates an example in which an input 413 of touching a first item is performed through a second region 410 while an input 411 of touching the first item is being performed through a first region 405 on a list screen 400 on which items are arranged, i.e., an example in which a multi-sequence input is performed upon the same item.

When a multi-sequence input has been performed upon the same item in the list in this manner, a list screen 420 on which the items are arranged in reverse order of the original order may be displayed as shown in FIG. 6(*b*). On the contrary, when a multi-sequence input has been performed by touching the first item through the first region 405 while touching the first item through the second region 410, a list of items that are arranged in the original order may again be displayed.

The mobile terminal may also be configured so as to operate in the opposite manner to that shown in FIG. 6 depending on the use environment or user setting of the multi-touch. That is, when a multi-sequence input has been performed by touching the first item through the second region 410 while touching the first item through the first region 405, a list of items which are arranged in the original order may be displayed. On the contrary, when a multi-sequence input has been performed by touching the first item through the first region 405 while touching the first item through the second region 410, a list of items that are arranged in the reverse order to the original may be displayed.

FIG. 7(*a*) illustrates an example in which an input 443 of touching one item is performed through a second region 440 while an input 441 of touching another item is being performed through a first region 435 on a list screen 430 on which items are arranged, i.e., an example in which a multi-sequence input is performed upon different items.

When a multi-sequence input has been performed in this manner, a list screen 450 on which the second touched item (item 3) is arranged next to the first touched item (item 1) may be displayed.

FIG. 8(*a*) illustrates an example in which an input 473 of touching a second item is performed through a second region 470 while an input 471 of touching a first item is being performed through a first region 465 on a list screen 460 on which items are arranged and then an input 475 of touching a third item is performed through the first region 465 while the input 473 of touching the second item is being performed through the second region 470. Two or more items may be selected using a multi-sequence input in this manner.

When a multi-sequence input has been performed in this manner, a list screen 480 on which the second touched item (item 3) is arranged next to the first touched item (item 1) and the third touched item (item 5) is arranged next to the second touched item (item 3) may be displayed.

In this manner, it is possible to easily change the order of items included in a list displayed on a list screen through a multi-sequence input.

<<Multiple Executions>>

Figure 9:
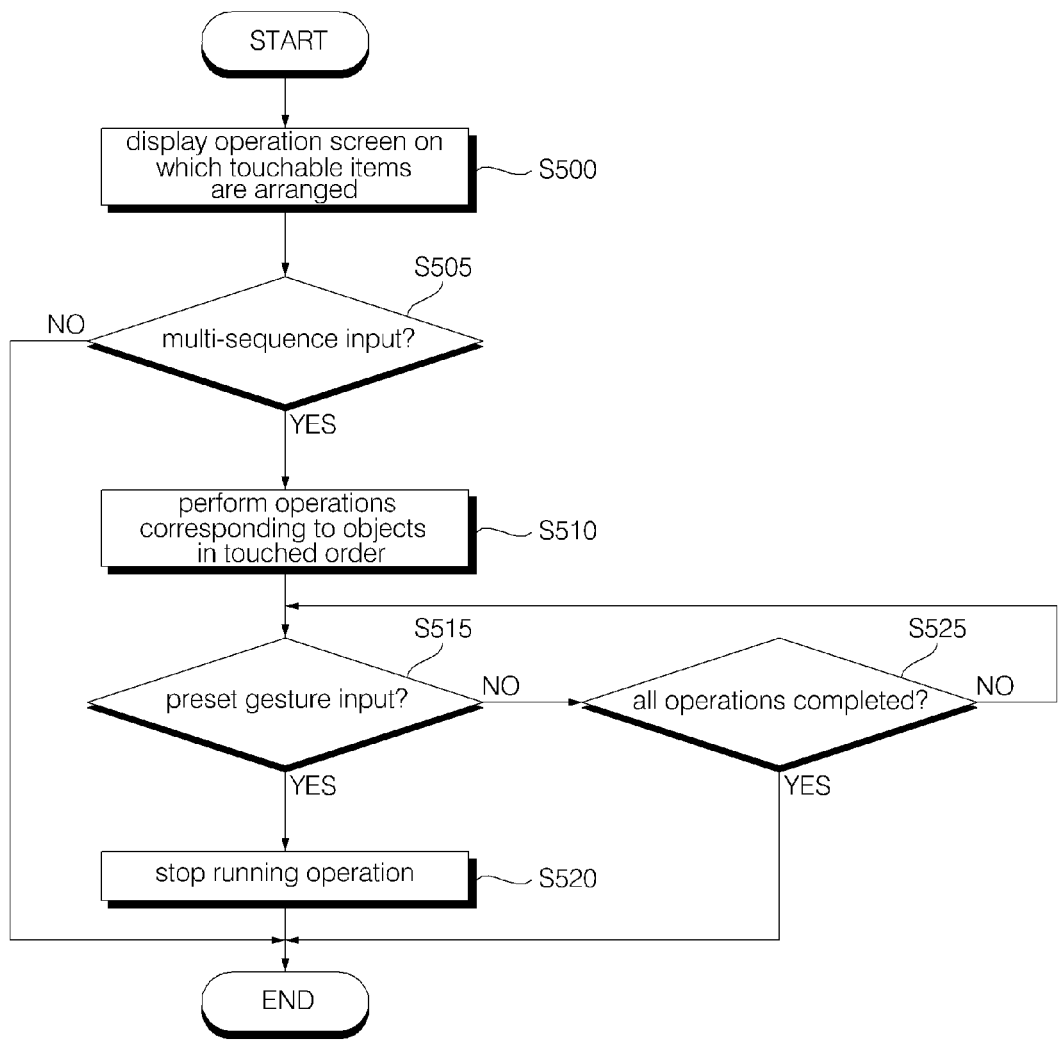
FIG. 9 is a flowchart illustrating an embodiment associated with multiple executions in a method for controlling the operation of a mobile terminal according to the present invention.

FIG. 9 is a flowchart illustrating an embodiment associated with multiple executions in a method for controlling the operation of a mobile terminal according to the present invention.

As shown in FIG. 9, the controller 180 displays an operation screen, on which a plurality of touchable objects is arranged, on the display module 151 including a touch screen according to a user command (S500). Here, each of the touchable objects is an object, which allows a corresponding operation to be performed through a touch input, such as a menu icon, a thumbnail, or a specific item of a list.

When a multi-sequence input has been performed while the operation screen is being displayed (S505), the controller 180 performs operations corresponding to objects, which have been touched through the multi-sequence input, in an order in which the objects have been touched (S510). That is, upon receiving a multi-sequence input of touching a second object through a second region while touching a first object through a first region on the operation screen, the controller 180 first performs an operation corresponding to the first object. When the operation is completed, the controller 180 performs an operation corresponding to the second object. A screen associated with execution of each operation may be displayed on the display module 151 or may be displayed as a virtual screen.

Two or more different objects may be touched through a multi-sequence input. The controller 180 may display items that are touched through a multi-sequence input such that the touched items can be discriminated from other items.

In addition, when operations are performed according to a multi-sequence input, the display module 151 may display an indicator or the like of the progress of the operations on a portion of the operation screen to indicate the currently performed operation and the next operation to be performed. Depending on the use environment of the mobile terminal, operations corresponding to the touched objects may be performed in a multitasking manner.

In the case in which a preset gesture input has been performed (S515), the controller 180 performs a control operation to stop the currently performed operation and an operation that is to be performed (S520).

Here, the gesture input is an input which has a preset drag path from among touch and drag inputs performed through the display module 151. In the case in which the mobile terminal is configured such that a proximity touch input can be performed using a proximity sensor 414 or the like, the mobile terminal allows the user to use a gesture input of moving their finger or the like in a preset pattern or form while placing the finger near the display module 151 within a predetermined distance. The pattern or form of the gesture input may be preset or stored by the user and a pattern set by default during manufacture of the mobile terminal may also be used.

The above procedure is performed until all operations corresponding to the selected objects are completely performed (S525).

Through the procedure described above, it is possible to sequentially perform operations corresponding to objects that are selected using a multi-sequence input on an operation screen on which a plurality of touchable objects is arranged.

Figure 10:
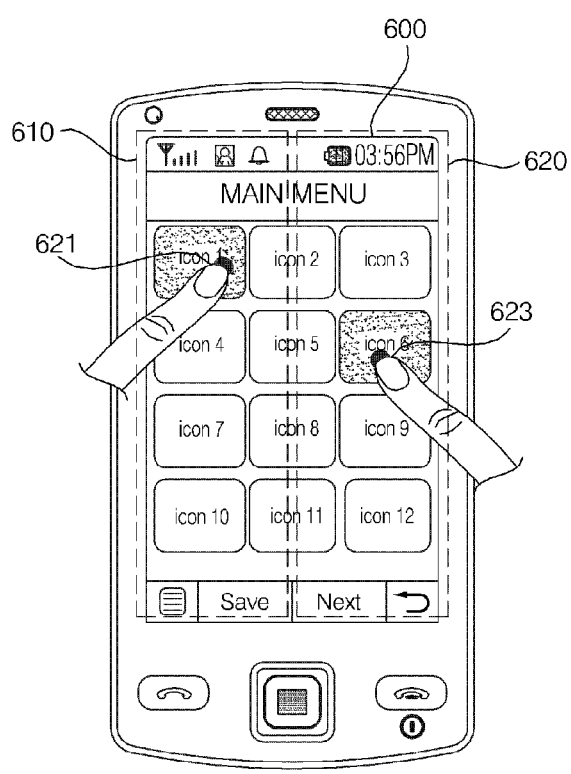
FIGS. 10 and 11 illustrate screens displayed on the display module which are used to explain operation control associated with multiple executions according to an embodiment of the present invention.
Figure 11:
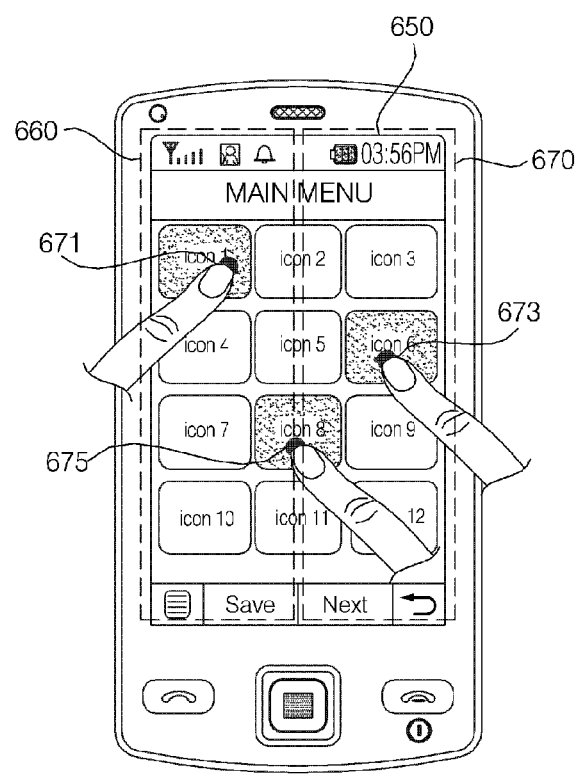

FIGS. 10 and 11 illustrate screens displayed on the display module which are used to explain operation control associated with multiple executions according to an embodiment of the present invention.

FIG. 10(*a*) illustrates an example in which an input 623 of touching a second menu icon is performed through a second region 620 on an operation screen 600 on which a plurality of menu icons is displayed while an input 621 of touching a first menu icon is being performed through a first region 610.

When this multi-sequence input has been performed, an operation corresponding to the first touched menu icon (icon 1) is performed and an operation corresponding to the second touched menu icon (icon 6) is performed after the operation corresponding to the first touched menu icon (icon 1) is completed.

When operations corresponding to a plurality of menu icons have begun to be performed after the menu icons are selected through a multi-sequence input, the operations corresponding to the selected objects may continue to be performed even when the operation screen 600 is not kept touched.

FIG. 11(*a*) illustrates an example in which an input 673 of touching a second menu icon is performed through a second region 670 on an operation screen 600 on which a plurality of menu icons is arranged while an input 671 of touching a first menu icon is being performed through a first region 660 and then an input 675 of touching a third menu icon is performed through the first region 660 while the input 673 of touching the second menu icon is being performed through the second region 670. Two or more objects may be selected through such a multi-sequence input.

When a multi-sequence input has been performed as shown in FIG. 11(*a*), an operation corresponding to the first touched menu icon (icon 1), an operation corresponding to the second touched menu icon (icon 6), and an operation corresponding to the third touched menu icon (icon 8) are sequentially performed.

That is, it is possible to sequentially perform operations corresponding to two or more touched menu icons according to a multi-sequence input. When a preset gesture input has been performed during execution of such operations, the currently performed operation and all operations that are to be performed may be stopped or only an operation corresponding to a selected menu icon may be stopped.

<<Action List>>

Figure 12A:
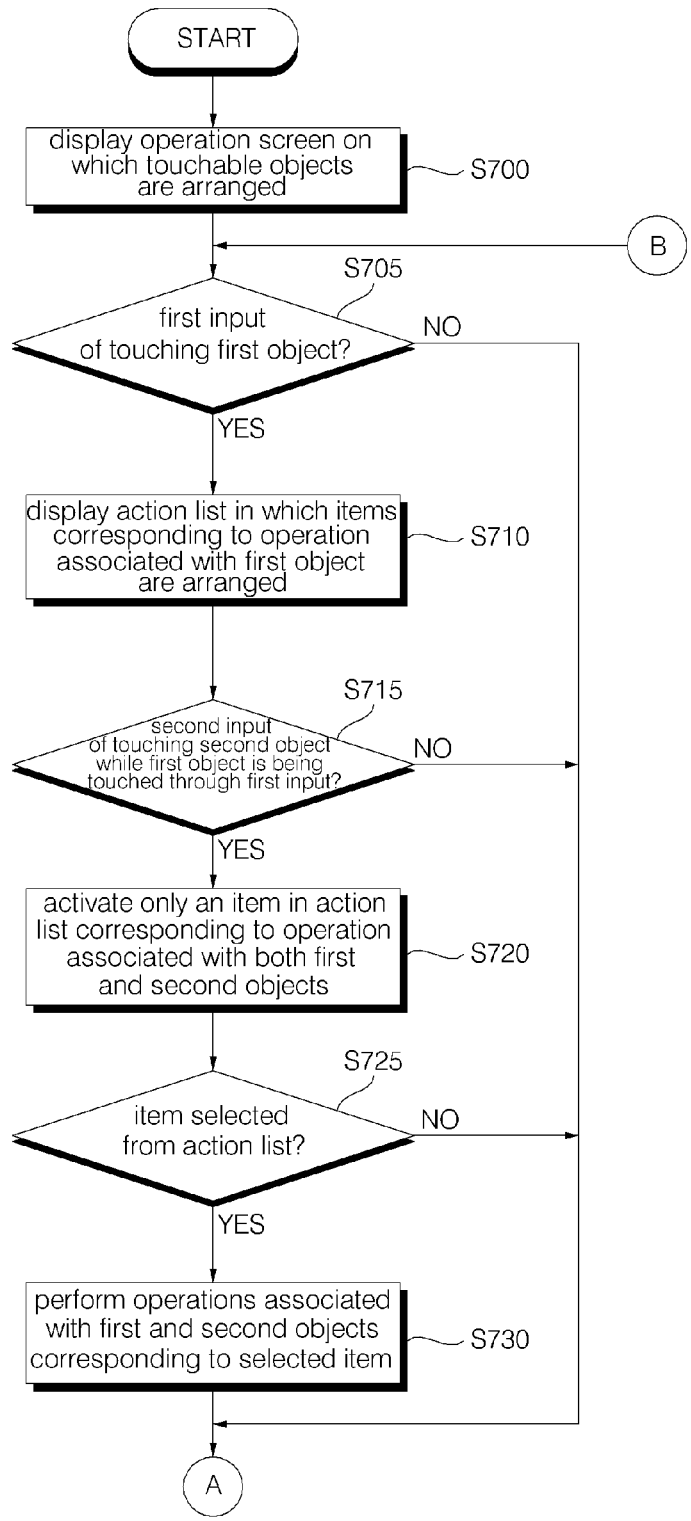
FIGS. 12A and 12B are flowcharts illustrating an embodiment associated with an action list in a method for controlling the operation of a mobile terminal according to the present invention.
Figure 12B:
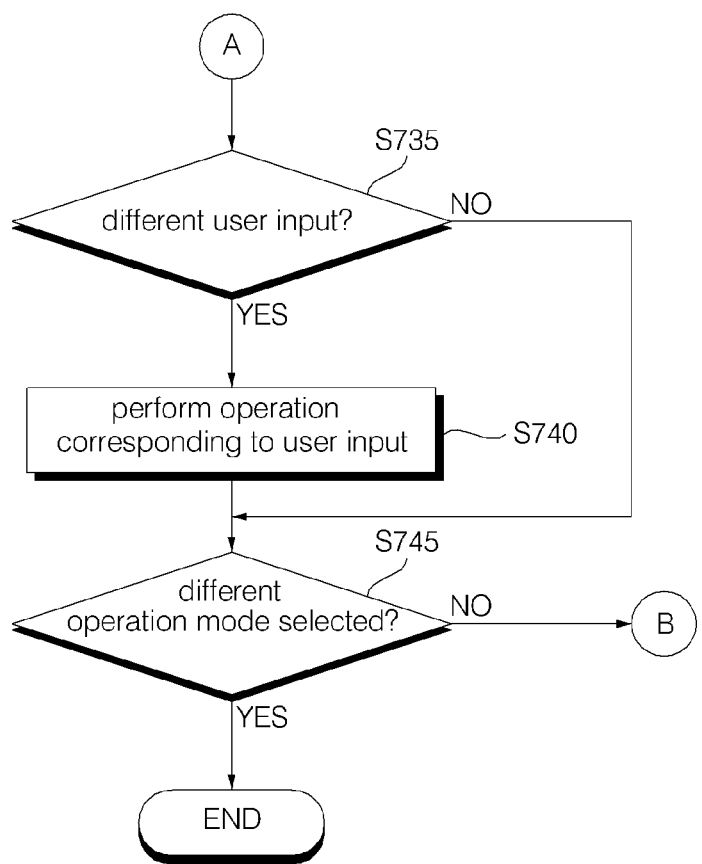

FIGS. 12A and 12B are flowcharts illustrating an embodiment associated with an action list in a method for controlling the operation of a mobile terminal according to the present invention.

As shown in FIG. 12A, the controller 180 displays an operation screen, on which a plurality of touchable objects is arranged, on the display module 151 including a touch screen according to a user command (S700). Here, each of the touchable objects is an object which allows a corresponding operation to be performed through a touch input, such as a menu icon, a thumbnail, or a specific item of a list.

When a first input of touching a first object has been performed through a first region on an operation screen while the operation screen is being displayed (S705), the controller 180 displays an action list including items corresponding to operations associated with the first object, which has been touched, on the display module 151 (S710). One of the operations associated with the first object can be performed by selecting a corresponding item from the action list.

When a second input of touching a second object has been performed through a second region on the operation screen while the first object is being touched through the first region (S715), the controller 180 activates an item(s) corresponding to an operation(s) that is associated with both the first and second objects from among the items displayed on the action list (S720). That is, when the first and second objects have been selected through a multi-sequence input, the controller 180 activates only an item that is commonly associated with the first and second objects and deactivates the remaining items.

Here, two or more different items may be touched through a multi-sequence input. The controller 180 may display items that are touched through a multi-sequence input in a different color or form from other items or in a different shading or boundaries from other items such that the touched items can be discriminated from other items. The controller 180 may also generate a haptic effect corresponding to the items which are touched through a multi-sequence input.

When an item has been selected from the action list (S725), the controller 180 performs operations associated with the first and second objects corresponding to the selected item (S730). Here, the controller 180 may sequentially perform the operations associated with the first and second objects. That is, the controller 180 may first perform the operation associated with the first object and then perform the operation associated with the second object after the operation associated with the first object is completed. A screen associated with execution of each operation may be displayed on the display module 151 or may be displayed as a virtual screen.

Depending on the selected item, an operation associated with the second object may be performed by a predetermined time interval during execution of an operation associated with the first object. For example, when the operation associated with the first object is video capture and the operation associated with the second object is image capture, specific video frames may be captured and stored by a predetermined time interval during video capture.

When operations are performed according to a multi-sequence input, the display module 151 may display an indicator or the like of the progress of the operations on a portion of the operation screen to indicate the currently performed operation and the next operation to be performed. Depending on the use environment of the mobile terminal, operations associated with the first and second objects may be performed in a multitasking manner.

In the case in which all items, other than only one item, in the action list are deactivated, operations associated with the first and second objects corresponding to the activated item may be immediately performed without the item selection procedure. In addition, when only one item is activated in the action list, the item may be magnified and displayed.

The mobile terminal may be configured such that, when a preset user input has been performed, the currently performed operation and all operations that are to be performed may be stopped.

Referring to FIG. 12B, when a different user input such as a key input or a general touch input is performed (S735), the controller 180 performs a control operation to perform an operation corresponding to the user input (S740). For example, the controller 180 may display another screen or may select a specific object on a screen and perform an operation corresponding to the specific object.

This operation is repeatedly performed until another operation mode is selected (S745). Through the procedure described above, it is possible to display, using a multi-sequence input, an action list in which items corresponding to operations associated with a selected object are arranged and to easily perform an operation associated with the selected object through the action list.

Figure 13:
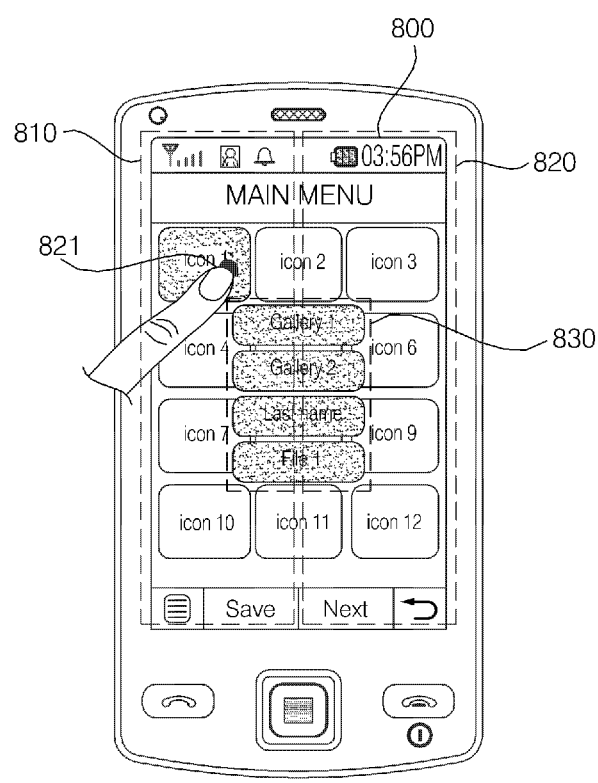
FIGS. 13 to 15 illustrate screens displayed on the display module which are used to explain operation control associated with an action list according to an embodiment of the present invention.
Figure 14:
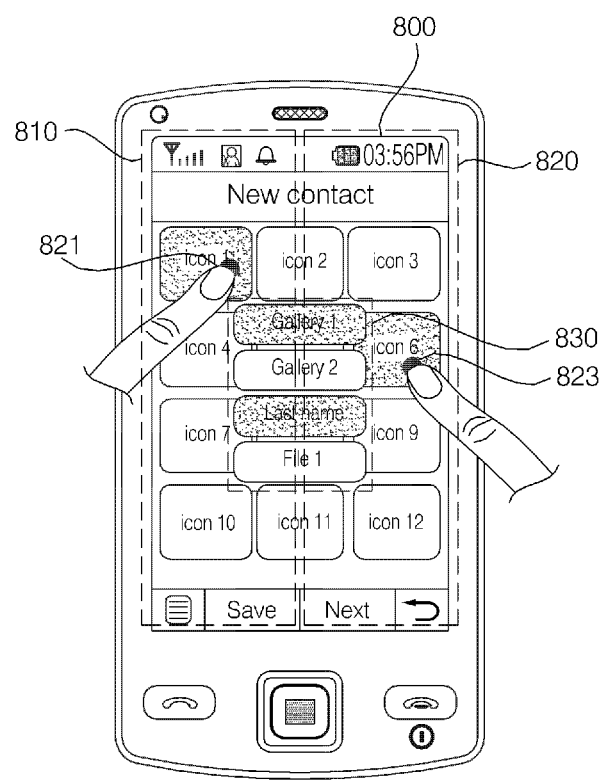
Figure 15:
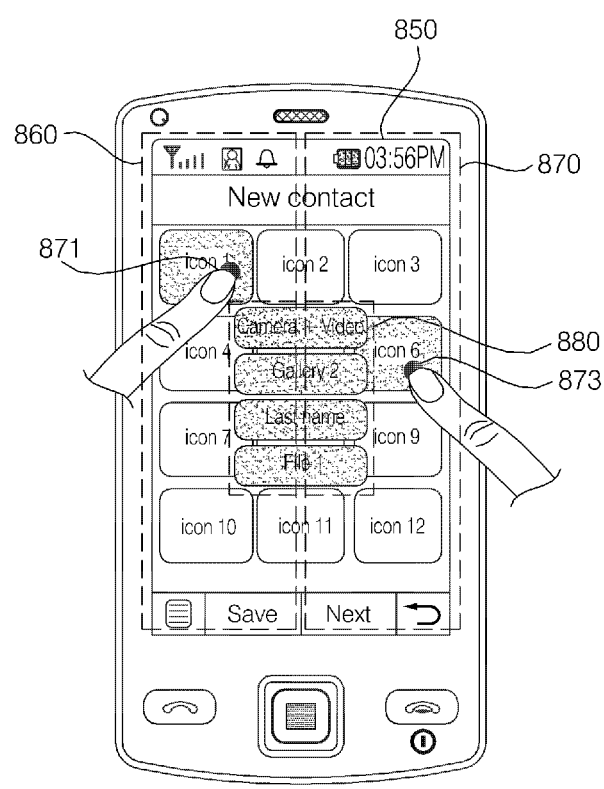

FIGS. 13 to 15 illustrate screens displayed on the display module which are used to explain operation control associated with an action list according to an embodiment of the present invention.

FIG. 13 illustrates an example in which an input 821 of touching a first menu icon is performed through a first region 810 on an operation screen 800 on which a plurality of menu icons is displayed. When the input 821 has been performed, the controller 180 may display an action list 830 in which items corresponding to operations associated with the first menu icon are arranged. All items (Operations 1 to 4) corresponding to operations associated with the first menu icon have been activated in the action list such that any item of the action list is selectable.

FIG. 14 illustrates an example in which an input 823 of touching a second menu icon is performed through a second region 820 on a screen 800 on which a plurality of menu icons is displayed while an input 821 of touching a first menu icon is being performed through a first region 810, i.e., an example in which a multi-sequence input is performed.

When such a multi-sequence input has been performed, the controller 180 activates only items (Operation 1 and Operation 3) corresponding to operations, which are associated with both the first and second menu icons, from among the items of the action list 830 and deactivates the remaining items (Operation 2 and Operation 4). Accordingly, only one item can be selected from among the activated items (Operation 1 and Operation 3) in the action list 830.

When an item is selected from the activated items in the action list 830, the controller 180 performs an operation associated with the first and second menu icons corresponding to the selected item.

FIG. 15 illustrates an example in which an input 873 of touching a second menu icon is performed through a second region 870 on a screen 850 on which a plurality of menu icons is displayed while an input 871 of touching a first menu icon is being performed through a first region 860. In this case, when only one item is activated in an action list 880, the controller 180 may immediately perform operations associated with the first and second menu icons corresponding to the activated item.

When the activated item is video capture and image capture, specific video frames may be captured by a predetermined time interval during video capture. That is, operations associated with the first and second menu icons may be sequentially performed and the operation associated with the second menu icon may also be performed by a predetermined time interval during the operation associated with the first menu icon. In addition, operations associated with the first and second menu icons may be performed in a multitasking manner.

<<Display of Icons>>

Figure 16:
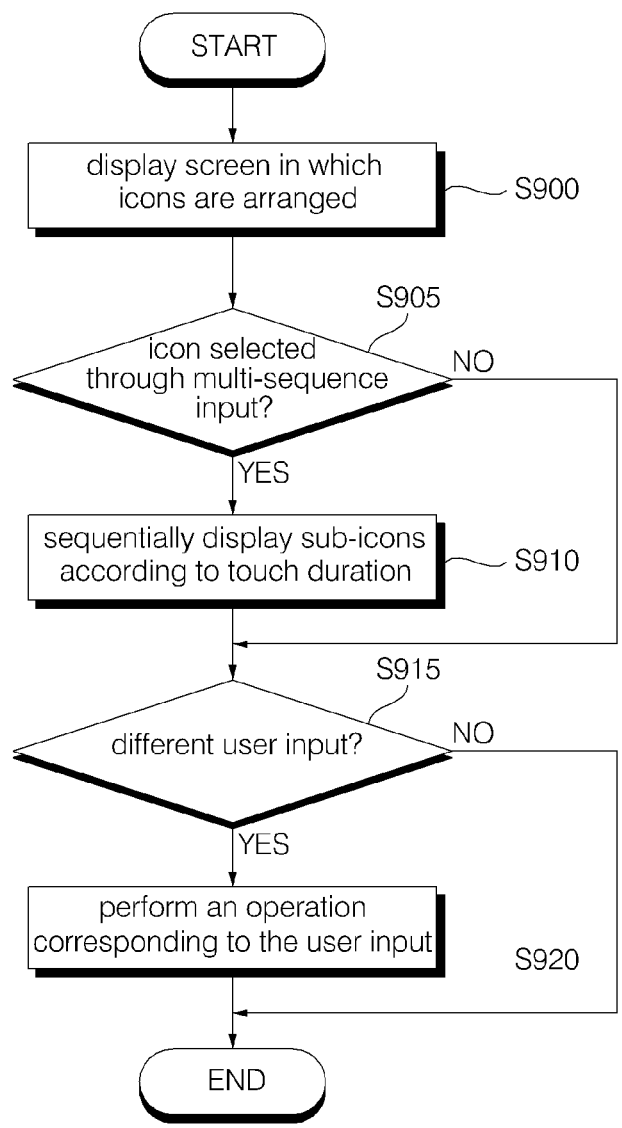
FIG. 16 is a flowchart illustrating an embodiment associated with display of icons in a method for controlling the operation of a mobile terminal according to the present invention.

FIG. 16 is a flowchart illustrating an embodiment associated with display of icons in a method for controlling the operation of a mobile terminal according to the present invention.

As shown in FIG. 16, the controller 180 displays an operation screen, on which a plurality of icons is arranged, on the display module 151 including a touch screen according to a user command (S900).

When an icon is selected according to multi-sequence input while the operation screen is being displayed (S905), the controller 180 sequentially displays sub-icons of the selected icon according to the touch duration of the selected icon (S910).

Here, an icon which is selected according to a multi-sequence input may vary depending on the state of setting. For example, the controller 180 may allow a second icon to be selected upon receiving a multi-sequence input of touching the second icon through the second region on the operation screen while a first icon is being touched through the first region. Instead, the first icon may be selected through the multi-sequence input or both the first and second icons may be selected through the multi-sequence input.

A specific icon may be selected simply by touching the specific icon through the second region while the first region is being touched. That is, the user can select a specific icon by touching the specific icon through the second region while touching any position of the first region.

The sub-icons displayed according to a multi-sequence input may include icons corresponding to sub-menu items of the selected icon or icons for executing detailed functions thereof. After the sub-icons are sequentially displayed instead of the selected icon as time elapses while the icon is being touched through the multi-sequence input, the selected icon may again be displayed.

The sub-icons, which are displayed according to the multi-sequence input, continue to be displayed even when the multi-sequence input is terminated. According to a setting state, the mobile terminal may be configured such that an operation corresponding to a sub-icon is immediately performed when the multi-sequence input is terminated while the sub-icon is being displayed.

When a different user input is performed (S915), the controller 180 performs a control operation to perform an operation corresponding to the user input (S920).

Through the procedure described above, it is possible to display a sub-icon belonging to a specific icon and to immediately perform a desired function or operation using a multi-sequence input.

Figure 17:
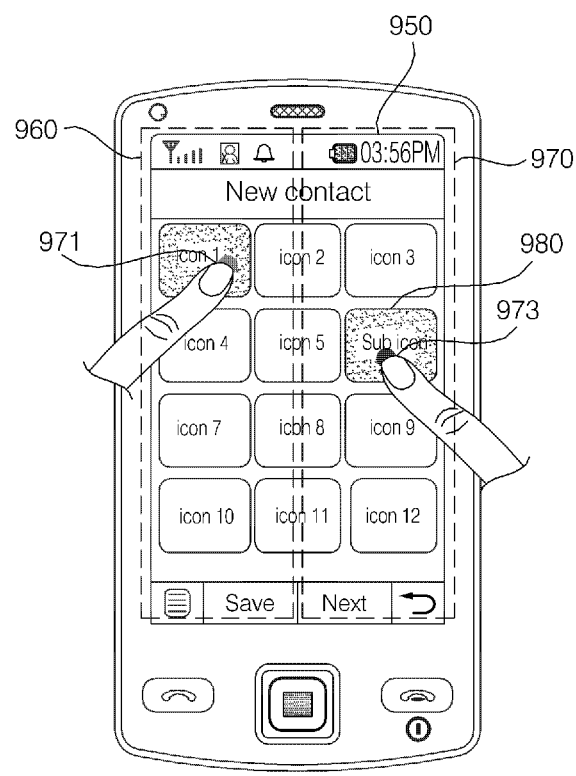
FIGS. 17 and 18 illustrate screens displayed on the display module which are used to explain operation control associated with display of icons according to an embodiment of the present invention.
Figure 18:
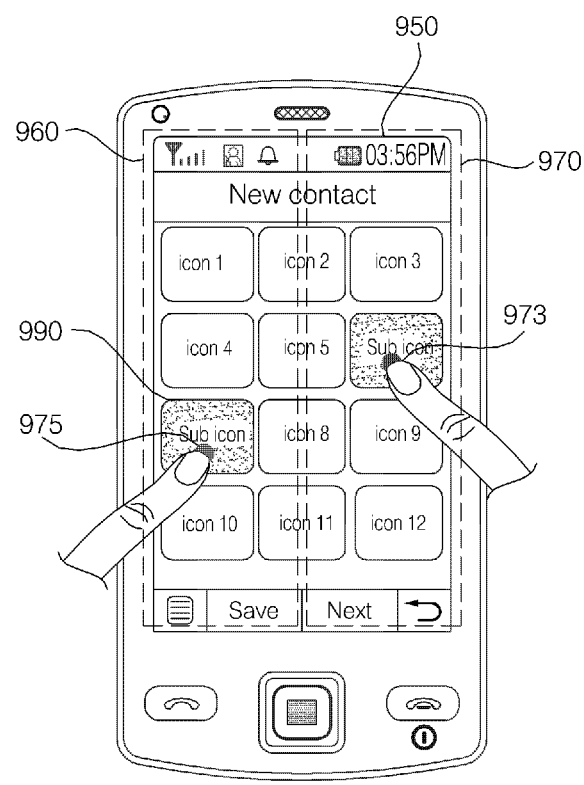

FIGS. 17 and 18 illustrate screens displayed on the display module which are used to explain operation control associated with display of icons according to an embodiment of the present invention.

FIG. 17 illustrates a menu screen 950 on which a plurality of menu icons is displayed. When an input 973 of touching a second menu icon is performed through a second region 980 on the menu screen 950 while an input 971 of touching a first menu icon is being performed through a first region 960, the controller 180 sequentially displays sub-icons 980 belonging to the second menu icon instead of the second menu icon according to the time during which the second menu icon has been touched. The sub-icons 980 may continue to be displayed even when the first input 971 or the second input 973 is terminated such that menu icons of different depths can be displayed together on one screen.

FIG. 18 illustrates an example in which an input 975 of touching a third icon is performed through the first region 960 while an input 973 of touching a second menu icon is being performed through the second region 970.

In this manner, menu icons can be continuously selected through a multi-sequence input. In this case, sub-icons 990 belonging to the third menu icon are sequentially displayed instead of the third menu icon.

It is possible to quickly select a desired function or operation by displaying menu icons of different depths on one screen using a multi-sequence input in this manner. Original icons may also be displayed on the screen instead of sub-icons by performing a touch input through a title region or a preset region of the screen.

The present invention can be embodied as processor readable code stored in a processor readable medium provided in the mobile terminal. The processor readable medium includes any type of storage device that stores data which can be read by a processor. Examples of the processor readable medium include Read Only Memory (ROM), Random Access Memory (RAM), CD-ROMs, magnetic tapes, floppy disks, optical data storage devices, and so on. The processor readable medium can also be embodied in the form of carrier waves such as signals transmitted over the Internet. The processor readable medium can also be distributed over a network of coupled processor systems so that the processor readable code is stored and executed in a distributed fashion.

As is apparent from the above description, according to the present invention, it is possible to control various operations of a mobile terminal using a multi-sequence input that is performed such that a second touch input is performed through a second region of a screen while a first touch input is being performed through a first region.

For example, using a multi-sequence input, it is possible to display an action list in which items corresponding to operations associated with a selected object are arranged and to easily perform an operation associated with the selected object through the action list. In addition, it is possible to display a sub-icon belonging to a specific menu icon and to immediately perform a desired function or operation using a multi-sequence input. It is also possible to improve the convenience of manipulation of a mobile terminal by using a combination of such a multi-sequence input and a general key input, a touch input, or the like.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for controlling operation of a mobile terminal, the method comprising:
    displaying a list screen including a list, in which a plurality of items is arranged in a first order, on a display module;
    receiving a multi-sequence input performed by touching a first item through a second region of the list screen while the first item is being touched through a first region thereof; and
    displaying the list in which the plurality of items is arranged in reverse order of the first order, on the display module.

2. The method according to claim 1, further comprising displaying the list in which the plurality of items is arranged in the first order upon receiving a multi-sequence input performed by touching the first item through the first region while the first item is being touched through the second region.

3. The method according to claim 1, further comprising displaying the list in which a third item is arranged next to a second item upon receiving a multi-sequence input performed by touching the third item through the second region while the second item is being touched through the first region.

4. The method according to claim 1, wherein all items of the list are selected when a touch input is performed through a title region of the list.

5. The method according to claim 1, wherein one of the first and second regions is a left region of the list screen and the other is a right region thereof where the list screen is divided into the left region and the right region.

6. The method according to claim 1, further comprising scrolling through the list screen when an input having directionality is performed through the list screen.

7. A mobile terminal comprising:
    a display module for displaying a list screen including a list in which a plurality of items is arranged in a first order; and
    a controller for displaying the list in which the plurality of items is arranged in reverse order of the first order upon receiving a multi-sequence input performed by touching a first item through a second region of the list screen while the first item is being touched through a first region thereof.

8. The mobile terminal according to claim 7, wherein the controller displays the list in which the plurality of items is arranged in the first order upon receiving a multi-sequence input performed by touching the first item through the first region while the first item is being touched through the second region.

9. The mobile terminal according to claim 7, wherein the controller displays the list in which a third item is arranged next to a second item upon receiving a multi-sequence input performed by touching the third item through the second region while the second item is being touched through the first region.

10. A method for controlling operation of a mobile terminal, the method comprising:
- displaying an operation screen, in which a plurality of touchable objects is arranged, on a display module;
- receiving a multi-sequence input performed by touching a second object through a second region of the operation screen while a first object is being touched through a first region thereof, the first region and the second region being a left half and a right half of the operation screen, respectively;
- performing operations corresponding to the first and second objects in order in which the first and second objects are touched in response to receiving the multi-sequence input;
- displaying, on a portion of the operation screen, an indicator representing a progress of the operations to indicate a currently performing operation and a next operation that is to be performed; and
- stopping the operations corresponding to the first and second objects when a preset gesture input is received while the operations are performed, the preset gesture input being a touch and drag input having a preset path on the display module.

11. The method according to claim 10, wherein the object includes at least one of a menu icon, a thumbnail, and a list item.

12. The method according to claim 10, wherein at least one of screens associated with performance of the operations is displayed as a virtual screen.

13. A mobile terminal comprising:
- a display module for displaying an operation screen in which a plurality of touchable objects is arranged; and
- a controller for performing operations corresponding to a first object and a second object in order in which the first and second objects are touched upon receiving a multi-sequence input performed by touching the second object through a second region of the operation screen while the first object is being touched through a first region thereof, the first region and the second region being a left half and a right half of the operation screen, respectively,
- wherein the controller controls the display module to display, on a portion of the operation screen, an indicator representing a progress of the operations in order to indicate a currently performing operation and a next operation that is to be performed, and
- wherein the controller stops the operations corresponding to the first and second objects when a preset gesture input is received while the operations are performed, the preset gesture input being a touch and drag input having a preset path on the display module.

14. The mobile terminal according to claim 13, wherein the object includes at least one of a menu icon, a thumbnail, and a list item.

15. The mobile terminal according to claim 13, wherein at least one of screens associated with performance of the operations is displayed as a virtual screen.

\* \* \* \* \*